United States Patent
Lewis

[15] 3,677,616
[45] July 18, 1972

[54] REDUCED NOISE HIGH RESOLUTION HOLOGRAPHIC IMAGING USING SPATIALLY INCOHERENT RECONSTRUCTING RADIATION

[72] Inventor: Robert W. Lewis, Ann Arbor, Mich.
[73] Assignee: Battelle Development Corporation, Columbus, Ohio
[22] Filed: May 3, 1971
[21] Appl. No.: 139,341

[52] U.S. Cl. ........................... 350/3.5, 350/162 SF, 350/320
[51] Int. Cl. ........................................................ G02b 27/00
[58] Field of Search ............... 350/3.5, 162 R, 162 SF, 163, 350/320; 96/27 H; 340/15.5 VD

[56] References Cited
UNITED STATES PATENTS
3,490,827   1/1970   Van Ligten et al. ............. 350/3.5

*Primary Examiner*—David Schonberg
*Assistant Examiner*—Ronald J. Stern
*Attorney*—Woodcock, Washburn, Kurtz & Mackiewicz

[57] ABSTRACT

An improved technique for coherent illumination and imaging of non-diffuse objects, including non-diffuse transparencies, wherein a periodic intensity variation across the illuminating beam at the object is substantially eliminated by integrating the pattern over some distance during the viewing or recordation of an object image. A spatially incoherent source having a size related to the period of the intensity distribution is disclosed to accomplish this integration in both direct imaging of an object and holographic reconstruction thereof.

4 Claims, 7 Drawing Figures

REDUCED NOISE HIGH RESOLUTION HOLOGRAPHIC IMAGING USING SPATIALLY INCOHERENT RECONSTRUCTING RADIATION

CROSS-REFERENCE TO A RELATED APPLICATION

This application is related to an application of Juris Upatnieks entitled "High Resolution Coherent Imaging with Reduced Noise" and filed concurrently herewith.

BACKGROUND OF THE INVENTION

This invention relates generally to optical techniques of forming an image of an object and more specifically relates to imaging a non-diffuse object with coherent light illumination.

Since the use of a laser as a source of coherent light has become practical, imaging with coherent light where advantageous has become common. One application of coherent imaging is in the field of microscopy where a three-dimensional object transparency to be examined, such as a biological specimen, is illuminated with coherent light and viewed with an optical system which magnifies the information contained in the transparency many times. Another application of coherent imaging is in the field of holography wherein a hologram is constructed that is capable of reconstructing at a later time the wavefront initially emanating from the object. In these and other applications of coherent light illumination, it is highly desirable that an object be illuminated and viewed without unwanted information in the form of noise being introduced into an object image by the illuminating or viewing system.

The use of coherent light to illuminate a nondiffuse object such as a transparency presents a problem not encountered in ordinary incoherent imaging of such objects. A major problem encountered is the formation of dark rings in the object image resulting from such things as dust or dirt upon the object or on an element of the optical system used in the imaging process. These dark rings are much broader than the resolution capabilities of the system and will draw the observer's attention away from the object image presented and may be so severe that a portion of the object information is obliterated. Such rings are formed from interference between light which is scattered by the dust and unscattered light at the image plane.

To eliminate or reduce the formation of these undesirable dark rings which are formed along with the image of the object, a diffusion plate such as ground glass is placed in the coherent illumination beam prior to its striking the object. The diffusion plate is chosen to vary the relative phase across the object-illuminating beam in a time invariant manner. Illumination with such a beam prevents the aforementioned formation of broad dark rings (usually called "noise") in an image since there are no longer two highly uniform wavefronts interfering at the image plane. These dark rings are in effect broken into many dark patches, each patch being reduced in size to the resolution capability of the system. The substitution of tiny patches for the broad dark bands greatly enhances the appearance of the image and does not obscure desired detail. The use of a diffusing plate in a coherent light transparency imaging system utilizing holography is more fully explained by Leith and Upatnieks in the Journal of the Optical Society of America, Nov. 1964, beginning at page 1295, and in U.S. Pat. No. 3,506,327, issued Apr. 14, 1970.

Although the use of a diffusion medium such as a ground glass plate in the object illuminating coherent light beam effectively reduces interference ring noise in the image of a non-diffuse object, another type of noise is introduced into the system by the ground glass plate. This added noise is a discernible grainy background which results from the existence of non-uniform intensity across the surface of the coherent beam illuminating the object. This type of noise is sometimes referred to as "speckle."

This grainy noise can be effectively eliminated by illuminating the non-diffuse object with a coherent light beam having a uniform intensity thereacross. This is reported by Upatnieks in Applied Optics, Nov. 1967 beginning at page 1905, and also in U.S. Pat. No. 3,539,241, issued Nov. 10, 1970. A pure phase plate is used that is characterized by random phase shifting properties across the face of the diffuser but with uniform amplitude transmission characteristic thereacross. However, noise suppression is not complete when the distance between the object and the source of the noise is small.

Another technique for illuminating a non-diffuse object transparency is described by Gerritsen et al. in Applied Optics, Vol. 7, No. 11, Nov. 1968, pages 2301-2311. This technique is to illuminate the non-diffuse object transparency with a plurality of coherent plane waves generated by a phase modulator. The plane waves strike the object at varying angles. This method of illumination provides redundancy for suppressing noise in holographic recording. A difficulty of this technique is that the plane waves interfere with one another in the plane of the object and produce a highly modulated intensity pattern. This intensity pattern is superimposed on an image of the transparency.

Therefore, it is a primary object of this invention to provide an improved technique of illuminating non-diffuse objects with coherent light for imaging thereof.

It is also an object of this invention to provide a technique for eliminating the effect of a regular intensity pattern across a coherent illuminating beam.

Classical approaches to removal of such intensity patterns from object images are to eliminate them by spatial filtering of the image or by defocusing an image of the object to spread out the intensity pattern. However, the use of spatial filtering essentially restricts object imaging to that of a single plane wave while a multiple beam object illumination technique is desired for many applications. Defocusing an object image has the disadvantage of causing an image resolution loss. Therefore, it is a further object of this invention to maintain effective multiple beam illumination of a non-diffuse object while eliminating the resulting undesirable intensity pattern across an object image without a significant loss of image resolution.

SUMMARY OF THE INVENTION

These and additional objects are accomplished according to the techniques of the present invention wherein an undesirable periodic intensity variation pattern across a coherently illuminated non-diffuse object is eliminated by imaging the pattern a number of times in distinct positions approaching infinity relative to a viewer or a photosensitive film in a manner to integrate the undesirable intensity pattern over an image of the object. This integration may be accomplished by constantly moving the intensity pattern relative to a photosensitive medium during its exposure.

Such integration is accomplished in a preferred form according to the present invention wherein the spatial coherence of the non-diffuse object illumination is destroyed in a controlled manner. The non-diffuse object is illuminated from a monochromatic spatially incoherent source having a dimension in one direction thereacross chosen so that images of the intensity pattern formed by point light sources positioned at the extreme edges of the incoherent source along this dimension would be displaced precisely an integral multiple (such as 1, 2, 3, etc.) of the basic period of the undesirable intensity variation pattern. Such a mono-chromatic spatially incoherent light source is formed with use of moving ground glass in a coherent light beam, to destroy its spatial coherence. The size of the light source is controlled by an opaque mask having an aperture therein of the desired dimensions.

In the holographic embodiment of the present invention, an off-axis hologram is constructed of a non-diffuse object according to known techniques wherein the non-diffuse object has an undesirable intensity variation pattern superimposed thereover. The hologram is reconstructed with a monochromatic spatially incoherent light source having dimensions so that images of the undesired intensity pattern reconstructed from the hologram from point sources on opposite edges of the incoherent source will be displaced precisely an integral multiple (such as 1, 2, 3, etc.) of the basic period of the undesirable intensity variation pattern in the given direction.

The undesirable intensity variation pattern across the surface of the non-diffuse object may result, for instance, from illuminating the object with a plurality of substantially uniform mutually coherent wavefronts which each strike the transparency at a different angle. These wave-fronts interfere with each other at the object and thus produce an intensity variation thereacross. This specific illuminating arrangement, as discussed previously, has been shown by others to be desirable for high resolution coherent imaging and, in particular high resolution holography. The techniques of the present invention reduce the effect of uneven object intensity illumination that exists with such a method of illumination.

The techniques of the present invention may be used with diffuse as well as non-diffuse objects. However, the undesirable intensity variation pattern (distribution) across an object is not so much of a problem if that object is diffuse enough to break up the intensity pattern. Also, it is unlikely that a diffuse object will be illuminated by a plurality of angularly separated plane wavefronts since a diffuse object provides its own redundancy in holography and, therefore, does not need the multiple illuminating beam to do so. In the context of this description, a "non-diffuse" object is one in which the diffracted light scattered from within the object makes up a small percentage of the light that is transmitted or reflected by the object. Typical non-diffuse objects are transparencies and specularly reflecting solid objects.

The multiple angularly displaced uniform (such as planar) wavefronts desired to illuminate a non-diffuse object are most easily obtained by passing a substantially uniform (such as planar) coherent wavefront through a modulating (diffusing) structure which breaks up this beam of light into angularly displaced diffracted orders of light. The modulating structure may be a grating modulated in intensity transmittance or may be a pure phase modulator. A fundamental period of the undesirable intensity pattern which illuminates an object is dependent upon the angle of intersection of various beams at the object. When a modulating structure or dispersive medium is utilized to obtain these angularly intersecting beams, the fundamental period of the intensity pattern across the object is related to the grating period of the modulating structure. The phrase "fundamental period" of the intensity pattern as used in this application is meant to refer to that the component of the intensity pattern with the lowest spatial frequency.

For a more detailed disclosure of the invention and for further objects and advantages thereof, reference should be had to the following description taken in conjunction with the accompanying drawings.

DESCRIPTION OF THE PREFERRED EMBODIMENTS

Figure 1:
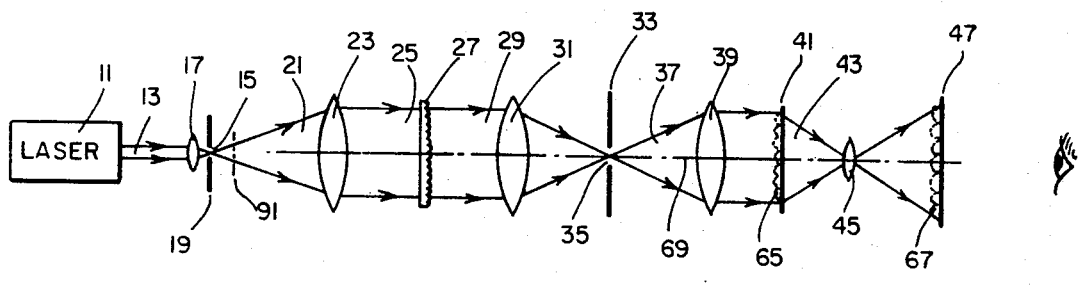
FIG. 1 illustrates a system for illuminating and imaging a non-diffuse object transparency.

Referring to FIG. 1, a typical system used to illuminate an object transparency with multiple coherent wavefronts is explained. A laser 11 generates a coherent light beam 13 which is brought to a point focus 15 by a spherical lens 17. A pinhole filter 19 is positioned with a very small aperture coincident with the light beam point focus 15, thereby assuring the spatial coherence of the resulting light beam. After passing through the pinhole filter 19, a diverging coherent light beam 21 is collimated by a lens 23. A collimated light beam 25 strikes a modulating structure (diffuser) or dispersive medium 27 and passes therethrough as a modulated coherent light beam 29. The light beam 29 is brought to a point focus by a lens 31 at a frequency plane 33. If the light beam 29 is collimated, the plane 33 is coincident with the focal plane of the lens 31. A spatial filter is provided at the plane 33 having an aperture 35 therein.

The modulator 27 creates certain diffracted orders of light in the illumination beam 29. The spatial filter aperture 35 is designed to allow only a few of these diffracted orders to pass through to illuminate the object transparency. A light beam 37 is, therefore, of limited spatial frequency content. The beam 37 is substantially collimated by a lens 39 to illuminate a non-diffuse object transparency 41. The object transparency 41 is illuminated with a multiplicity of angularly displaced beams, according to the spatial frequency content of the beam 37. A coherent light beam 43 contains information of the object 41. The object 41 is imaged by a lens 45 onto a surface 47. The object image at the surface 47 may be viewed directly or it may be recorded by positioning a photosensitive medium coincident with the surface 47.

The modulating structure 27 is preferably a phase modulator. That is, the modulating structure 27 has a substantially uniform light amplitude transmittance thereacross. A phase modulator may be constructed by exposing an ordinary photographic film to a light intensity pattern followed by bleaching the developed film until clear. Phase modulators have an advantage over intensity gratings in that the plurality of diffracted beams for illumination of an object can be made to have substantially the same intensity.

Figure 2:
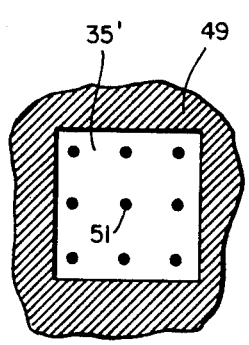
FIG. 2 shows a spatial filter of FIG. 1.

Referring to FIG. 2, one of many possible spatial filter apertures 35 (FIG. 1) is shown in an enlarged view. The aperture 35' permits passage therethrough of a total of nine diffracted light orders, each of which is denoted by a dark dot of FIG. 2. The center dot 51 represents the zero or undiffracted light order. The number of light orders allowed to pass through the plane 33 of FIG. 1 is determined by the type of imaging that is to be accomplished. Nine light orders, as shown in FIG. 2, is that number presently utilized in micro-holographic applications but any number of orders higher or lower than the nine orders shown can be used so long as at least two light orders are present. It is preferable for most applications that the modulating structure 27 of FIG. 1 be constructed in a manner to produce diffracted orders that form a symmetrical two-dimensional pattern of dots at the spatial frequency plane.

Forming a two-dimensional array of light beams as part of the diffuse light beam 29 (FIG. 1) requires a two-dimensional grating as part of the modulating structure 27. This may be in the form of a single structure or may be two one-dimensional gratings placed in tandem with their gratings oriented at some angle to each other.

Figure 3:
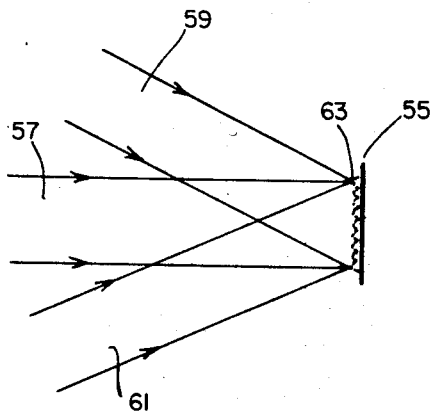
FIG. 3 illustrates in an exaggerated form the way in which a transparency is illuminated by multiple beams in the system of FIG. 1.

Each of the dots at the spatial frequency plane 33 of the system of FIG. 1, as illustrated in FIG. 2, represent essentially an individual light beam that strikes the transparency 41 at a unique angle therewith. That is, the zero order beam 51 will strike the transparency 41 substantially perpendicular therewith while all of the other light orders that are allowed to pass through the spatial filter aperture 35 strike the transparency 41 as separate beams displaced from the zero order beam at some finite angle. This may be illustrated in an exaggerated form with reference to FIG. 3 wherein three beams are shown to strike an object transparency 55 at distinct angles therewith. The beam 57 could be a zero order or undiffracted beam while the beams 59 and 61 on either side thereof would probably be first order diffracted beams. It is the interference between the three beams 57, 59 and 61 at the transparency 55 that results in an undesirable intensity pattern across the object 55. This intensity pattern is noted on FIG. 3 as dotted lines 63 and on FIG. 1 as dotted lines 65 and 67.

This intensity variation which illuminates an object is undesirable because it is superimposed on the object and images as noise. For instance, with reference to FIG. 4, such an intensity varying pattern 65 is shown. The pattern 65 is of the type developed by the optical system of FIG. 1 when nine orders of light are passed at the spatial frequency plane 33 of FIG. 1. Referring again to FIG. 4, the magnified view of such an intensity pattern is seen to be a grid pattern having a fundamental period of recurrence $\tau_v$ in a vertical direction and $\tau_H$ in a horizontal direction. It is this intensity variation across an illuminated object that is eliminated by the techniques of the present invention.

It should be noted that the transparency 41 of FIG. 1 could be positioned between the diffuser 27 and the lens 31, with appropriate adjustments being made in the lenses to form an image of the transparency 41 at the plane 47. Such an image would still have an undesired intensity pattern superimposed thereover so long as the spatial filter aperture 35 allows only selected spatial frequencies to pass. This is the case even if the transparency 41 is positioned to be illuminated with a wavefront of uniform amplitude thereacross. The transparency 41 may be uniformly illuminated, for instance, by positioning it immediately against a uniform amplitude transmittance modulator 27 in the form of a phase modulator.

Figure 4:
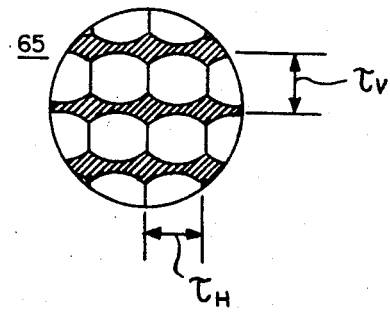
FIG. 4 indicates a magnified example of the undesirable intensity variation pattern across an object image that is formed by an optical system of FIG. 1 without the use of the techniques of the present invention.

Referring to FIG. 1, the effect of the undesirable intensity variation pattern (distribution) 65 with which the non-diffuse object transparency 41 is illuminated may be eliminated or substantially eliminated by translating the pattern 65 relative to the viewer or other photosensitive detector in a particular manner. For example, a photosensitive medium may be positioned coincident with the image plane 47 to record an image of the object 41. During exposure of this photosensitive medium, the intensity variation patterns 65 and 67 are translated at a substantially uniform speed a maximum distance in any one direction that is equal to one or some other integral multiple of the fundamental period of the intensity variation in that direction. When the intensity distribution is a two-dimensional one as shown in FIG. 4, the translation of the pattern 67 relative to the photosensitive film at the plane 47 is a two-dimensional one and is preferably in the nature of a rectangle having sides parallel to the grid lines of the intensity pattern 65 of FIG. 4. Each individual side of the rectangular path of the relative motion has a length equal to one or some other integral multiple of the fundamental intensity pattern period in a direction to which the side is parallel.

One way to accomplish this relative movement between the intensity pattern 67 and a photosensitive medium positioned coincident with the surface 47 is to translate the medium relative to the optical axis 69. The difficulty with this technique is that the film is translated relative to the object transparency 41 and thus records an image thereof with some loss of resolution. Alternatively, the pattern 67 could be moved over the film placed coincident with the surface 47 while that film remains stationary with respect to the object 41. This particular movement can be accomplished, for instance, by moving the point focus 15 of the coherent light source beam. Such movement can be accomplished by moving the laser 11, lens 17 and pinhole filter 19 as a unit. The path and amount of motion thereof would be that necessary to give the desired translation between the intensity pattern 67 and the photographic film positioned at plane 47, in the manner described hereinabove.

Figure 5:
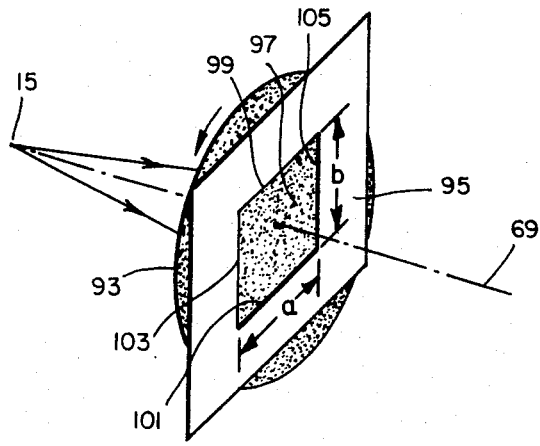
FIG. 5 shows optical elements for insertion into the system of FIG. 1 in carrying out the present invention according to one aspect thereof.

It has been found that by destroying the spatial coherence of the object illuminating beam in a particular controlled manner, the intensity pattern 65 which illuminates the transparency 41 is substantially eliminated. The destruction of the spatial coherence of the light beam 13 in a manner to bring about this desired result is accomplished by positioning at a position 91 of FIG. 1 a rotating ground glass and an opaque mask having an aperture of a specific size therein. Referring to FIG. 5, a rotating ground glass 93 and a mask 95 are shown which can be added to the configuration of FIG. 1 by positioning them approximately in the position indicated by the dotted line 91. The ground glass 93 is shown to be rotated but it may, alternatively, be moved in some other pattern, such as back and forth along a straight line perpendicular to the optical axis 69 of FIG. 1. Use of moving ground glass in a coherent light beam is meant to be only an example of how a monochromatic spatially incoherent light beam may be derived and is not to be considered limiting of the present invention. Other techniques of generating a monochromatic spatially incoherent light beam may alternatively be employed.

The opaque mask 95 is provided with an aperture 97 through which the monochromatic spatially incoherent light passes. The aperture is a rectangular shape corresponding to the specific example of a spatial filter aperture 35 that is shown in FIG. 2. The sides of the aperture 97 are oriented to be parallel with the grid lines of the undesirable intensity variation pattern 65.

The dimensions of the aperture 97 are related to the fundamental period of the intensity variation pattern 65. The opposing edges 99 and 101 of the aperture 97 are separated a distance $b$. The distance $b$ is chosen so that a point light source coincident with the edge 99 will form an undesirable intensity variation pattern 65 that is shifted relative to the optical axis 69 and the transparency 41 a distance in its vertical direction equal to one or some other integral multiple of the fundamental intensity variation period in that direction ($\tau_v$ of FIG. 4). Similarly, opposing sides 103 and 105 of the aperture 97 are separated a distance $a$. The distance $a$ is that horizontal separation of point illuminating sources that will shift the undesirable intensity variation pattern 65 relative to the optical axis 69 a distance that is equal to one or some other integral multiple of its fundamental period in that direction ($\tau_H$ of FIG. 4).

The result of illuminating the object 41 through the diffuser and aperture of FIG. 5 is to substantially eliminate the intensity pattern 65. Therefore, the pattern 67 of an image 47 of the transparency 41 is also eliminated. When the elements of FIG. 5 are utilized in the optical system of FIG. 1, lenses 23 and 31 are designed and positioned in a manner to image the aperture 97 into the aperture 35 of the spatial frequency plane 33.

Instead of viewing or recording the object modified beam 43 of FIG. 1 directly, it is generally desirable to record the wavefront 43 holographically for later reconstruction. However, when the spatial coherence of the light which illuminates the object 41 is destroyed, as described with respect to FIGS. 1 and 5, no hologram can be constructed. The wavefront 43 is no longer coherent enough to form an interference pattern with a reference beam. However, another aspect of the present invention contemplates constructing a hologram of the object 41 with coherent light according to known techniques and then to reconstruct the hologram with monochromatic spatially incoherent light according to the techniques of the present invention.

Figure 6:
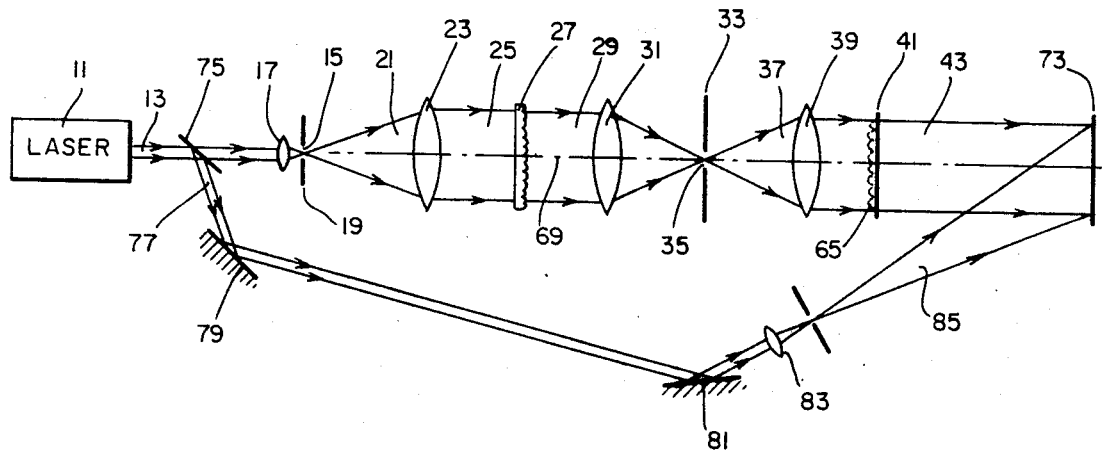
FIG. 6 is an optical system for constructing a hologram of a non-diffuse transparent object.

Referring to FIG. 6, an optical system similar to that of FIG. 1 is shown for constructing a hologram of the non-diffuse object 41. The object 41 as shown in FIG. 6 is illuminated in the same manner as described hereinabove with respect to FIG. 1 without the modification thereof shown in FIG. 5. The object modified beam 43 of FIG. 6, instead of being imaged onto a photographic film or being viewed directly, is directed toward a hologram detector 73. This detector may be any one of a number of photosensitive media that are presently being utilized in holographic applications, including photopolymer materials and ordinary silver halide photographic film.

The required reference beam for recording the wavefront 43 as an off-axis hologram on the detector 73 of FIG. 6 is obtained from the laser 11. A beam splitter 75 is positioned in the path of the beam 13 to divert a portion of its light intensity into an independent beam 77. The beam 77 is reflected from the mirrors 79 and 81 and is then brought to a point focus by a spherical lens 83 to provide a diverging reference beam wavefront 85. The reference beam wavefront 85 is mutually coherent with the information carrying beam 43 and interfers therewith at the hologram detector 73 to record an off-axis hologram of the object 41.

It should be noted that the use of the diffusing structure 27 of FIG. 6 is not the only way that a multiplicity of angularly displaced beams can be obtained for illuminating the object 41 during construction of a hologram. For instance, a series of beam splitters and lenses could be used to illuminate the object 41 with a plurality of beams angularly displaced from one another. Also, some kind of lenslet array could be used as in substitution for the diffusing structure 27.

Whatever means are used for obtaining the multiplicity of angularly displaced object illuminating beams, it is preferable that all of the object illuminating beams be of substantially equal intensity. This is not a requirement for practicing the present invention but it is desirable to provide the maximum redundancy in holographic recording of an object so illuminated and thus it is best for suppressing undesirable noise.

Figure 7:
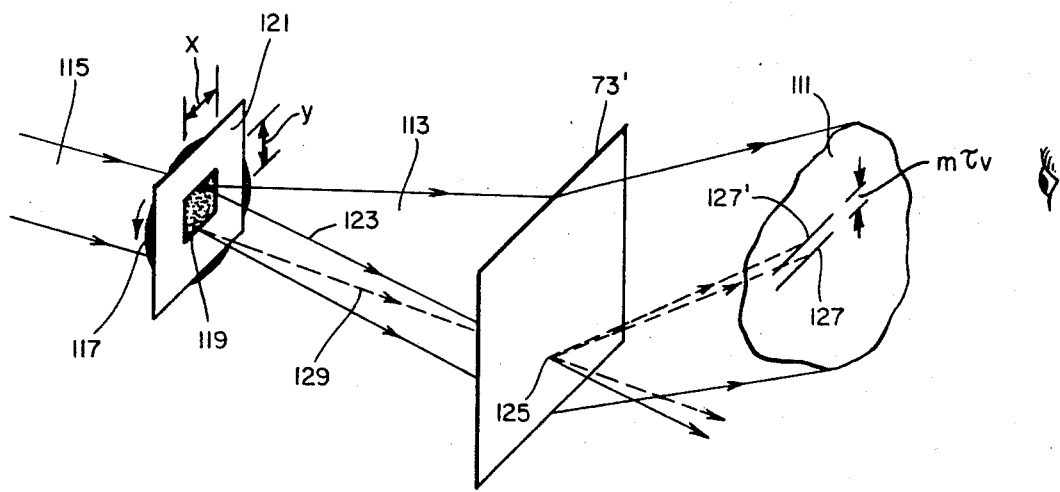
FIG. 7 shows a reconstruction according to the present invention in another of its aspects of a hologram constructed by the system of FIG. 6.

After exposure of the hologram detector 73 of FIG. 6, the detector is processed, if processing is required for the particular photosensitive material employed, to form a hologram 73'. The hologram 73' can be reconstructed according to ordinary techniques but the image reconstructed will be that of the desired object 41 with the undesired intensity pattern 65 superimposed thereover. According to the techniques of the present invention, with reference to FIG. 7, the hologram 73' illuminated with a monochromatic spatially incoherent light beam 113. The beam 113 is generated, in a preferred technique, by directing a monochromatic spatially coherent light beam 115 from a laser (not shown) against a rotating ground glass diffuser 117 and thence through an aperture 119 of an opaque mask 121. If the hologram 73' were illuminated with monochromatic spatially coherent light directly from the laser beam 115 according to known techniques, the image 111 would have an undesired intensity variation pattern 65 superimposed thereover. In the technique of FIG. 7, the aperture 119 is constructed with dimensions similar to that of the aperture 97 of FIG. 5 described hereinabove to eliminate this undesired intensity variation pattern.

The aperture 119 of FIG. 7 has opposite horizontally extending edges which are separated a distance $Y$ such that images reconstructed from the hologram 73' by point spatially coherent light sources positioned at these opposite edges of the aperture 119 will reconstruct images having the undesired intensity distribution pattern displaced precisely one or some other integral multiple of its fundamental intensity variation period in a vertical direction. For instance, the light ray 123 incident upon the hologram at a point 125 from the top horizontally extending edge of the aperture 119 will reconstruct a horizontally extending grid line 127 of the reconstructed image 111. The distance $Y$ of the aperture 119 is chosen so that a light ray 129 of the beam 113, originating from the bottom horizontally extending edge of the aperture 119, strikes the same point 125 of the hologram 75' to reconstruct an image 127' of the same grid line. The image 127' is displaced from the image 127 a vertical distance equal to one or some other integral multiple ($m$) of the fundamental period of the intensity variation pattern ($\tau_v$) as it appears in the reconstructed image 111.

Similarly, the aperture 119 contains opposing vertical edges separated a distance $x$ so that images reconstructed by point spatially coherent light sources at the opposite edges separated by this distance $x$ will reconstruct two images that are displaced a distance precisely equal to one or an integral multiple of the basic period of the interference pattern. The sides of the aperture 119 are oriented parallel with the grid lines of the undesired intensity pattern of the image. By such a technique of illumination, the undesirable intensity pattern is spread out over the image 111 and will not appear to an observer in the image 111 of the object 41.

It may be noted that the use of a moving scatterer (93 of FIG. 5; 117 of FIG. 7) in a beam of coherent light, along with a mask (95 of FIG. 5; 121 of FIG. 7), permits precise control of the spatial coherence of the illuminating source and thus is a preferred technique of illumination. Controlling the shape of the spatially incoherent source through the respective masks is equivalent to performing an incoherent spatial filtering operation on a spatial intensity distribution that would appear at an output of an optical system if the illuminating source was a monochromatic point source. The impulse response of a spatial filter for performing such an operation has the same shape as the spatial intensity distribution of the sources formed in FIGS. 5 and 7 with the use of masks. The techniques of the present invention are directed toward control of the size and shape of the transparency illuminating (FIG. 5) or a hologram illuminating (FIG. 7) light source. This is similar to choosing a spatial filter's impulse response in order to completely eliminate or achieve maximum attenuation of some particularly undesirable intensity variation introduced by a diffuser.

One could generalize and say that the Fourier transform of the impulse response associated with the filtering operation performed on the spatial intensity distribution must be zero for frequencies associated with undesirable intensity variations to completely eliminate this variation. Solutions for the desired impulse response may also be obtained using other criteria, such as minimizing some specified means square error. The impulse response must be real and non-negative since it is synthesized by controlling the spatial intensity distribution of the source. It is usually important that the impulse response be as narrow as possible.

For simplicity, let us consider two one-dimensional examples of incoherent spatial filtering operations to eliminate a particular intensity fringe, $I(x) = A \cos[2\pi(x/T)]$ $\mathscr{F}T\{\ \} =$ Fourier Transform Operation $\delta(f_x) =$ Dirac $\delta$ function $$\mathscr{F}T[I(x)] = \frac{A}{2}\left[\delta\left(f_x - \frac{1}{T}\right) + \delta\left(f_x + \frac{1}{T}\right)\right]$$

which is nonzero for $f_x = \pm 1/T$.

Let $h(x)$ be the impulse response of the incoherent spatial filtering operation necessary to eliminate $I(x)$.

$$\mathscr{F}T\{h(x)\} = \hat{h}(f_x)$$

We require that $$\hat{h}\left(\pm \frac{1}{T}\right) = 0 \qquad (1)$$

if a) $h(x) = \text{rect}\dfrac{x}{T} = \begin{cases} 1 & \left|\dfrac{X}{T}\right| \leq \dfrac{1}{2} \\ 0 & \text{otherwise} \end{cases}$ $$\hat{h}(f_x) = T\frac{\sin \pi f_x T}{\pi f_x T}$$

and Eq. (1) is satisfied; if b) $h(x) = A\left[\delta\left(x - \dfrac{T}{4}\right) + \delta\left(x + \dfrac{T}{4}\right)\right]$ $$\hat{h}(f_x) = 2A \cos\left(2\pi f_x \frac{T}{4}\right)$$

and again Eq. (1) is satisfied.

It will be understood that the invention is not limited to the specific arrangements shown, and that changes and modifications may be made within the scope of the appended claims.

What is claimed is:

1. In a method of illuminating a non-diffuse object with a plurality of angularly displaced mutually coherent light beams derived from a single coherent light source, thereby generating an undesirable intensity variation pattern across said non-diffuse object, the improvement of generating a uniform average intensity monochromatic wavefront for illuminating said object, comprising the step of modifying said coherent light source to become a mono-chromatic spatially incoherent source having a defined size with at least one pair of opposite parallel sides that are parallel to lines of the undesirable intensity variation pattern, said at least one pair of parallel sides being separated a distance which would result in shifting said intensity pattern lines across said object a distance equal to an integral multiple of its fundamental period by moving a coherent point light source from one of said opposing pair of parallel sides to the other.

2. The improved method according to claim 1 wherein the step of modifying the coherent light source to become the monochromatic spatially incoherent source of a defined size includes positioning in the path of a light beam of said coherent source a light diffuser and an opaque mask having an aperture therein which defines the size of said monochromatic spatially incoherent source, said diffuser being given motion to destroy the spatial coherence of the coherent light beam.

3. A method of constructing and reconstructing a hologram of a non-diffuse object in reconstructing an image therefrom, comprising the steps of:

illuminating said non-diffuse object with a plurality of angularly displaced mutually coherent light beams, thereby forming an object modified beam which contains information of the object plus an undesirable intensity variation pattern thereacross, recording an off-axis hologram on a holographic detector positioned in the path of said object modified beam by directing against said detector a reference light beam mutually coherent with said object illuminating beams, whereby a hologram is constructed from which an image of said object could be reconstructed by illumination with coherent light but which would have the undesirable intensity variation pattern superimposed thereover, reconstructing an image of said object from said hologram by directing thereagainst a monochromatic spatially incoherent light beam from a source of finite dimensions, said source having at least one pair of parallel sides separated a distance such that if a point coherent source of coherent light were to illuminate the hologram and be moved from a position coincident with one side of said incoherent source to the other side of said incoherent source, lines of the intensity pattern superimposed on a reconstructed image would be translated an integral multiple of a fundamental period of intensity variation of said superimposed pattern, said at least one pair of parallel sides additionally being parallel to said intensity pattern lines that would be reconstructed with a point coherent light source.

4. The method as defined by claim 3 wherein the step of illuminating the hologram additionally includes the steps of:

directing a coherent light beam toward a light diffuser and thence therethrough as a dispersed coherent light beam, positioning a mask in the dispersed coherent light beam, said mask having an aperture therein with said finite dimensions, and providing motion of said light diffuser relative to said coherent light beam to destroy the spatial coherence of said coherent light beam.

* * * * *